UNITED STATES PATENT OFFICE.

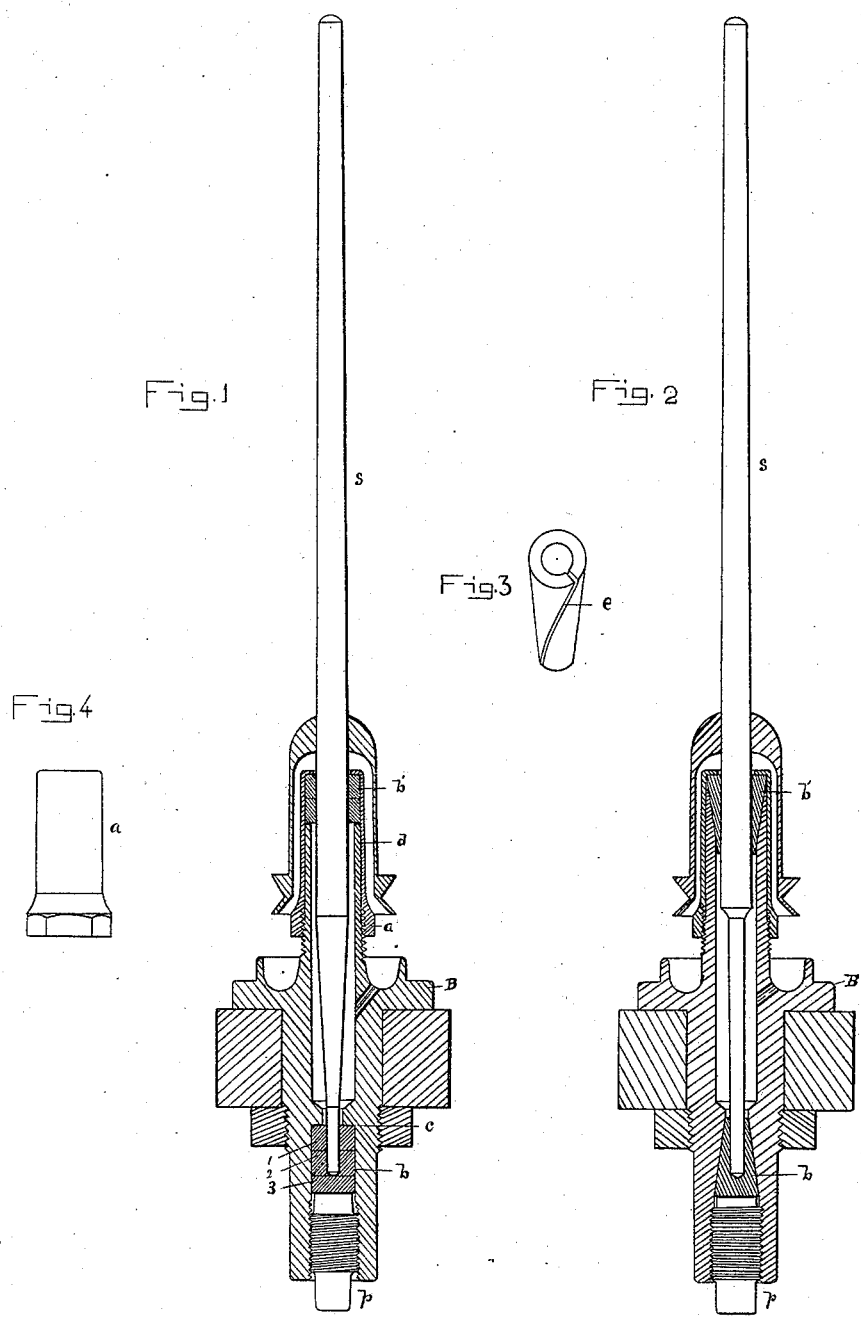

CHARLES H. CHAPMAN, OF GROTON, ASSIGNOR TO THE EUREKA SPINDLE COMPANY, OF AYER, MASSACHUSETTS.

SPINDLE-BOLSTER.

SPECIFICATION forming part of Letters Patent No. 341,995, dated May 18, 1886.

Application filed March 3, 1886. Serial No. 193,817. (No model.)

*To all whom it may concern:*

Be it known that I, CHARLES H. CHAPMAN, of Groton, in the county of Middlesex and State of Massachusetts, have invented a new and useful Improvement in Spindle-Bolsters; and I do hereby declare the following to be a full, clear, and exact description thereof, in connection with the accompanying drawings.

My invention relates to that class of bolsters in which all the bearings for the spindle, including the step-bearing, are located within the bolster; and it consists, essentially, in providing the bolster-case with bearings for the spindle having an elastic or compressible capacity, and in providing screws or their equivalents to retain such bearings in place and afford means to compress such elastic bearings independently within their support or housing, and thereby secure a proper fit at all times.

It also consists in arranging such elastic bearings within the bolster case or housing, in connection with a sleeve-whirl, in such a manner as to give the spindle no contact or bearing at or near the plane of the band-pull, and forming the spindle of such a size between the bearings that it shall have a slight elastic or yielding capacity, and not only be able to utilize more completely the cushion effect of the band tension, but also to spring or yield at or near the plane of the band-pull when acted upon by the forces developed by an unequally-balanced bobbin-load, and thereby enabled to better adjust itself to such load and run steadily at high speed without gyration.

Spindles as heretofore constructed, which were designed to embody a self-centering capacity, have been provided with metal bearings loosely fitted within the bolster-case and cushioned therein by means of oil or other elastic packing surrounding the bearing; and it is well known that in order to secure a proper steadiness of rotation the spindle must be made to fit its bearings very closely at all times. From this fact the bearings have to be frequently renewed; but such renewals are not entirely successful, as the bearing-surfaces of the spindle have themselves become more or less worn, and do not, therefore, properly fill the renewed bearing; hence it has been practically impossible heretofore to secure a proper fit of the spindle and its bearings after they have once become worn. Before my invention no attempt, so far as I am aware, has been made to overcome this defect by providing the spindle with bearings having an elastic or compressible capacity, and applying means whereby either of such bearings could be adjusted by compression at any time and a close and accurate fit thereby maintained. I am not aware, also, that heretofore any attempt has been made to secure the necessary cushion for this class of spindles by supporting the spindle wholly within bearings formed from non-metallic and yielding material and possessing in themselves the necessary degree of softness or elasticity to cushion the spindle against vibration, and enable it to yield laterally when seeking its true center of rotation. I have found by experiment, however, that by the use of such non-metallic yielding material I am able to secure the double function of the capacity for compression and adjustment, and also that of the cushion effect described. The combined effect of these, together with the arrangement of the bearings and form of spindle, co-operate to secure the object of my invention—viz., to provide a spindle which can be run at very high rates of speed without vibration under all the conditions which occur in practical use.

I am aware that before my invention spindles of this class having a sleeve-whirl have been constructed without bearing-contact at the plane of the band-pull; but I am not aware that such spindles have been made of a size between the bearings to enable them to yield to the centrifugal force of the bobbin-load when seeking a true center of rotation, or that such spindles were combined with bearings which would permit of such yielding.

Referring to the drawings, Figure 1 is a sectional elevation showing in section the bolster case, bolster-rail, sleeve-whirl, elastic bearings, and retaining-cap, the spindle and screw-plug being in elevation. Fig. 2 is a similar view, showing a modification in the arrangement for compressing the bearings; Fig. 3, a perspective elevation of the modified form of bolster-bearing removed, as shown in Fig. 2, and Fig. 4 an elevation of the screw-cap removed.

In Fig. 1 it will be seen that the step-bearing $b$ is applied to the bolster case or housing B from below, and is held in place against the fixed shoulder $c$ by means of the screw-plug $p$. This bearing is preferably made in sections 1 2 3, formed from any non-metallic compressible material, such as vulcanized fiber, leather, cork, &c. I have found the vulcanized fiber to be the most desirable material, however. The lower section, 3, serves to receive the vertical pressure of the spindle $s$, and at the same time operates to close the bearing against the escape of oil when the plug $p$ is screwed up to its normal pressure. From this construction it is evident that as the step-bearing becomes loose by reason of wear or otherwise, a slight turn of the screw-plug will compress the yielding bearing against the shoulder $c$, and it will be forced by the pressure to close around the spindle-step until a proper fit is secured. The upper or bolster bearing, $b'$, is adjusted in a similar manner. The screw-cap $a$ constitutes a sleeved extension of the supporting-tube $d$, and serves as a housing for the bolster-bearing. When the cap is screwed down, the bearing is received against the head of the supporting-tube and the bearing compressed until a proper fit is secured.

In Fig. 2 the bearings $b$ $b'$ are shown as tapering externally and fitted to corresponding tapers formed in the housing which supports them. This form greatly increases the capacity for adjustment. When this form is used, they are preferably made from a solid plug and with one side or wall cut through and opened in a spiral course, as shown at $e$, Fig. 3.

It will be observed that the spindle $s$ takes no contact or bearing at or near the plane of the band-pull and that it is reduced in size from that point downward to the step. This construction and arrangement not only allows the spindle to receive the full cushion effect due to the band tension, which it could not do if it had contact at that point, but it also allows it to spring or yield slightly between its bearings, and thereby change the direction of its axis of rotation to accommodate an unequally-distributed bobbin-load. It is obvious that the excess of leverage and weight of load above the bearings is so great that a slight capacity to yield between the bearings will give an ample latitude of accommodation to the bobbin-load above. It is also obvious that the spindle could not thus yield to its load were it held in rigid bearings.

I have found that in practice the form of spindle as shown in Fig. 1 is best adapted for warp and the heavier forms of bobbins, while for filling quills and very light bobbin-loads the spindle should be reduced, as shown in Fig. 2, in order that it may yield to the controlling effect of its load.

I do not wish to limit myself to the particular form or arrangement of the screw-cap and plug as means for applying pressure to the bearings, as such form and arrangement may be varied as desired.

Having thus described my invention, what I claim is—

1. A spindle and its whirl combined with a bolster-case having independent and elastic or compressible step and bolster bearings for such spindle, and provided with screws to retain such bearings in place and afford means whereby pressure may be applied independently to each of the said bearings, and the same adjusted to the spindle, as set forth.

2. A spindle and its whirl and a tubular bolster-case therefor having a fixed internal shoulder, and provided with an independent and elastic or compressible step-bearing for the foot of the spindle, combined with a screw-plug applied to the lower end of the bolster-case and adapted to force the step-bearing upward against the said shoulder and compress it about the foot of the spindle, as set forth.

3. A spindle having its lower end reduced and provided with a sleeve-whirl, combined with a bolster-case provided with independent and yielding bearings adapted to support the spindle without contact at or near the plane of the band-pull, as set forth.

In testimony whereof I have hereunto set my hand in the presence of two subscribing witnesses.

CHARLES H. CHAPMAN.

In presence of—
 JAMES R. GRAY,
 WILLIAM BROWN.